(12) United States Patent
Watanabe et al.

(10) Patent No.: US 11,493,854 B2
(45) Date of Patent: Nov. 8, 2022

(54) PRINTING SHEET

(71) Applicants: SHAKOU SHOUKAI CO., LTD., Tokyo (JP); NALOT CO., LTD., Tokyo (JP)

(72) Inventors: Yoshizo Watanabe, Tokyo (JP); Mitsuo Yamashita, Tokyo (JP)

(73) Assignees: SHAKOU SHOUKAI CO., LTD., Tokyo (JP); NALOT CO.. LTD., Tokyo (JP)

( * ) Notice: Subject to any disclaimer, the term of this patent is extended or adjusted under 35 U.S.C. 154(b) by 82 days.

(21) Appl. No.: 16/772,389

(22) PCT Filed: Dec. 13, 2017

(86) PCT No.: PCT/JP2017/044795
§ 371 (c)(1),
(2) Date: Jun. 12, 2020

(87) PCT Pub. No.: WO2019/116478
PCT Pub. Date: Jun. 20, 2019

(65) Prior Publication Data
US 2021/0072655 A1  Mar. 11, 2021

(51) Int. Cl.
*G03G 7/00* (2006.01)
*C09J 7/29* (2018.01)
(Continued)

(52) U.S. Cl.
CPC ............... *G03G 7/008* (2013.01); *C09J 7/20* (2018.01); *C09J 7/29* (2018.01); *G03G 7/0086* (2013.01);
(Continued)

(58) Field of Classification Search
CPC .... G03G 7/008; G03G 7/0086; G03G 7/0006; G03G 7/0046; G03G 7/0053; C09J 7/20;
(Continued)

(56) References Cited

U.S. PATENT DOCUMENTS 5,437,917 A    8/1995  Ohe et al.
2008/0182200 A1*  7/2008  Kim ..................... G03G 7/0013
                                          430/270.14

FOREIGN PATENT DOCUMENTS

JP    H06-95420 A    4/1994
JP    H06-337537 A   12/1994
(Continued)

OTHER PUBLICATIONS

English of translation of JP2014186051A. (Year: 2014).*
(Continued)

*Primary Examiner* — Patricia L. Nordmeyer
(74) *Attorney, Agent, or Firm* — Manabu Kanesaka

(57) ABSTRACT

A printing sheet is formed of a base material film, a toner fixing layer formed on one principal surface of the base material film, a planarization layer formed on the other principal surface of the base material film, an adhesive layer formed on the surface of the planarization layer, and a peeling film stuck on the surface of the adhesive layer. The base material film has a laminated structure composed of a white foamed PET film layer on the toner fixing layer side and a transparent non-foamed PET film layer on the adhesive layer side, and the strength of the printing sheet is improved by the combined use of the non-foamed PET film. The planarization layer is formed of a colored ink layer, e.g. white ink layer, and increases the bonding area of the adhesive layer with the base material film side, thereby achieving smooth peeling from an adherend.

5 Claims, 4 Drawing Sheets

(51) Int. Cl.
*C09J 7/20* (2018.01)
*G09F 3/10* (2006.01)
*G09F 3/02* (2006.01)

(52) U.S. Cl.
CPC .................. *G09F 3/02* (2013.01); *G09F 3/10* (2013.01); *C09J 2467/006* (2013.01); *Y10T 428/14* (2015.01)

(58) Field of Classification Search
CPC ......... C09J 7/29; C09J 2467/006; G09F 3/02; G09F 3/10; Y10T 428/14
See application file for complete search history.

(56) References Cited

FOREIGN PATENT DOCUMENTS

| | | |
|---|---|---|
| JP | H07-271079 A | 10/1995 |
| JP | 2003-228699 A | 8/2003 |
| JP | 2004-331696 A | 11/2004 |
| JP | 2014-186051 A | 10/2014 |
| JP | 2016-14077 A | 1/2016 |
| WO | 2007/113982 A1 | 10/2007 |

OTHER PUBLICATIONS

English of translation of JP2003228699A. (Year: 2003).*
PCT/ISA/210, "International Search Report for International Application No. PCT/JP2017/044795," dated Jan. 23, 2018.
Europe Patent Office, "Search Report for European Patent Application No. 17934485.8," dated May 21, 2021.

* cited by examiner

PRINTING SHEET

RELATED APPLICATIONS

The present application is National Phase of International Application No. PCT/JP2017/044795 filed Dec. 13, 2017, the disclosure of which is hereby incorporated by reference herein in its entirety.

TECHNICAL FIELD

The present invention relates to a printing sheet, and more specifically, to an improvement in strength and an improvement in peelability of a printing sheet having a toner fixing layer for which toner is fixed by heat such as a laser printer, a copying machine, or the like.

BACKGROUND ART

As a printing sheet that is printed by fixing thereto toner by heat such as a laser printer, a copying machine, or the like, there is provided a printing medium disclosed in Patent Literature 1 described below made by the present inventors. The printing medium described in Patent Literature 1 is a printing medium one surface of which is printable and the other surface of which can be stuck on an adherend surface, and has a configuration that includes a base material film prepared with a polyethylene terephthalate resin, an adhesive layer formed on a lower surface of the base material film, and a peeling film prepared with a polyethylene terephthalate resin and stuck on the surface of the adhesive layer, and a toner fixing layer formed on an upper surface of the base material film. Specifically, as shown in FIG. 4A, the printing medium 100 has a laminated structure in which the printing medium 100 has a toner fixing layer 104 on an upper surface of a base material film 102 made of a white foamed PET (foamed polyethylene terephthalate containing a white pigment) layer and has an adhesive layer 106 on a lower surface of the base material film 102, and on the surface of the adhesive layer 106, a peeling film 108 made of a white foamed PET film is provided.

When the printing medium 100 is stuck on various types of adherends including a car body, first, a desired character, figure, or the like is printed on the side of a printing surface of the printing medium 100, and then, the peeling film 108 is peeled off to expose the adhesive layer 106, and the exposed surface is pressed against the surface of the adherend.

CITATION LIST

Patent Literature

Patent Literature 1: Japanese Published Unexamined Patent Application No. 2016-14077

SUMMARY OF INVENTION

Technical Problem

As the base material film of Patent Literature 1 described above, a PET film (a film prepared with a polyethylene terephthalate resin) has been used, and specifically, a generally readily available colored (for example, white) foamed PET film has been used. However, because of the addition of pigment for coloring, the strength is weak and the sheet may be torn when the base material film 102 is peeled from the adherend. Moreover, as shown in FIG. 4B, because the adhesive layer 106 is formed on the base material film 102 that is in a foamed state, the area of a bonding portion 112 between the surface of a foamed PET layer containing foam 110 and the adhesive layer 106 is narrow. Therefore, there has been a problem such that, when the base material film 102 is peeled from the adherend, pulling of the adhesive layer 106 toward the base material film 120 is weak, and peeling lines from peeling are left due to zipping.

The present invention has been made by focusing on such points as above, and an object thereof is to provide a printing sheet which has high strength and can be smoothly peeled without leaving traces of peeling when it is peeled from an adherend.

Solution to Problem

A printing sheet of the present invention includes a base material film, a toner fixing layer which is formed on one principal surface of the base material film and is printable, an adhesive layer which is formed on the other principal surface of the base material film, and a peeling film which is stuck on the surface of the adhesive layer, wherein the base material film is a transparent non-foamed polyethylene terephthalate resin film.

A printing sheet of another invention includes a base material film, a toner fixing layer which is formed on one principal surface of the base material film and is printable, an adhesive layer which is formed on the other principal surface of the base material film, and a peeling film which is stuck on the surface of the adhesive layer, wherein the base material film having a laminated structure of a foamed polyethylene terephthalate resin film-on the toner fixing layer side, and a transparent non-foamed polyethylene terephthalate resin film-on the adhesive layer side.

In a main mode of the invention, a planarization layer is provided between the base material film and the adhesive layer.

A printing sheet of still another invention includes a base material film, a toner fixing layer which is formed on one principal surface of the base material film and is printable, a planarization layer which is formed on the other principal surface of the base material film, an adhesive layer which is formed on the surface of the planarization layer, and a peeling film which is stuck on the surface of the adhesive layer, and the base material film is a foamed polyethylene terephthalate resin film.

In a main mode of the invention, the planarization layer is a colored ink layer. In another mode of the invention, the foamed polyethylene terephthalate resin film contains a colored pigment. In still another mode of the invention, the peeling film is a foamed polyethylene terephthalate resin film containing a colored pigment. The foregoing and other objects, features, and advantages of the present invention will be apparent from the following detailed description and the accompanying drawings.

Advantageous Effects of Invention

A printing sheet according to the present invention includes a base material film, a toner fixing layer which is formed on one principal surface of the base material film and is printable, an adhesive layer which is formed on the other principal surface of the base material film, and a peeling film which is stuck on the surface of the adhesive layer, and adopts any of the following:

(1) the base material film is a transparent non-foamed polyethylene terephthalate resin film;

(2) the base material film has a laminated structure of a foamed polyethylene terephthalate resin film on the toner fixing layer side and a transparent non-foamed polyethylene terephthalate resin film on the adhesive layer side; and (3) the base material film is a foamed polyethylene terephthalate resin film, and a planarization layer is provided between the base material film and the adhesive layer. Therefore, the present invention has an effect that a printing sheet having a toner fixing layer is improved in strength and smooth peeling without leaving traces of peeling becomes possible when it is peeled from an adherend.

DESCRIPTION OF EMBODIMENTS

Hereinafter, best modes for carrying out the present invention will be described in detail based on examples.

Example 1

Figure 1A:
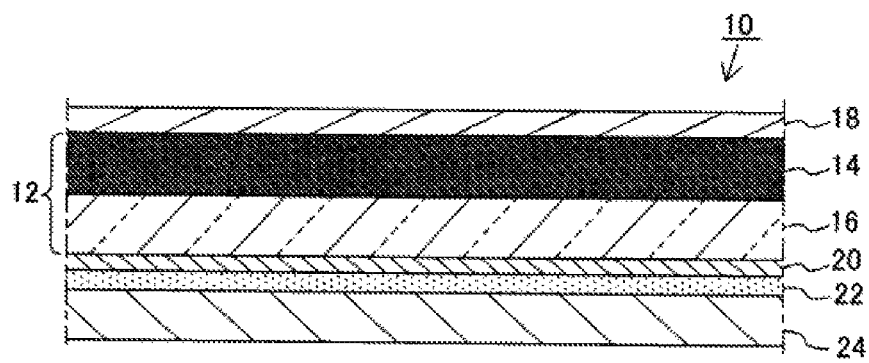
FIGS. 1(A) and (B) are sectional views each showing a laminated structure of a printing sheet of Example 1 of the present invention.
Figure 1B:
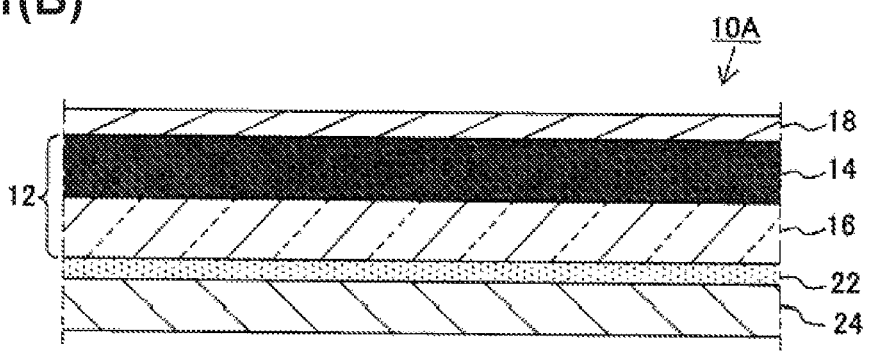

First, Example 1 of the present invention will be described with reference to FIGS. 1(A) and 1(B). FIGS. 1(A) and 1(B) are sectional views each showing a laminated structure of a printing sheet of the present example. The printing sheet of the present invention is a printing sheet having a toner fixing layer for which toner is fixed by heat such as a laser printer, a copying machine, or the like, and is used as a tacking sheet or the like the base material of which is a film material.

First, beginning with a description from the example shown in FIG. 1A, the illustrated printing sheet 10 has a laminated structure that is configured of a base material film 12, a toner fixing layer 18 which is formed on one principal surface of the base material film 12, a planarization layer 20 which is formed on the other principal surface of the base material film 12, an adhesive layer 22 which is formed on the surface of the planarization layer 20, and a peeling film 24 which is formed on the surface of the adhesive layer 22. In the present example, the base material film 12 has a laminated structure of a white foamed polyethylene terephthalate resin film (hereinafter, referred to as a "white foamed PET film") layer 14 on the toner fixing layer 18 side and a transparent non-foamed polyethylene terephthalate resin film (referred to as a "non-foamed PET film") layer 16 on the adhesive layer 22 side.

As the foamed PET layer 14, for example, a white layer added with a white pigment is used. The PET layer 14 has a thickness, for example, on the order of 30 to 40 μm, and the transparent PET layer 16 has a thickness, for example, on the order of 40 to 60 μm. As the toner fixing layer 18, for example, a layer formed of a urethane-based material is used. The toner fixing layer 18 has a thickness of, for example, 1 to 3 μm in the case of glossy print, and 2 to 4 μm in the case of matte print.

As the planarization layer 20, for example, a white ink layer is used. As the white ink, a mixture of titanium oxide and a urethane-based material is used. The planarization layer 20 is provided between the base material film 12 and the adhesive layer to increase the bonding area with the adhesive layer 22. Accordingly, the adhesive layer 22 is more strongly adhered to the base film 12 side, and when the printing sheet 10 stuck on an adherend is peeled from the adherend by pulling the adhesive layer 22 toward the planarization layer 20, this enables smooth peeling without leaving traces of peeling due to zipping. Also, by making the white foamed PET layer 14 with a thickness thinner than in the conventional case, it becomes transparent as a whole, on the other hand, by using the planarization layer 20, it becomes possible to make it opaque, and the planarization layer 20 also functions as an opaquing layer. In the present example, a white ink layer is used as the planarization layer 20, but the ink layer is not limited to white, and use of an ink layer in another color is not prevented.

The adhesive layer 22 is made with a resin having adhesiveness and bondability, and one using, for example, an ethylene-vinyl acetate copolymer resin is used, however, use of various other publicly known adhesives is not prevented. For the peeling film 24, for example, a white foamed PET film is used, but this is also not limited to white. In order to feed the printing sheet 10 as described above through a copying machine, the thickness of each layer is designed such that, for example, the entire thickness becomes within a range of 10 to 300 μm depending on use. The printing sheet 10 of the present example is a glossy/matte type.

The printing sheet 10 is used by appropriately printing the content on the toner fixing layer 18 and peeling from the peeling film 24 and sticking it on an object (not shown). For example, when the best before date and/or the contents are described on the toner fixing layer 18 of the printing sheet 10 and the printing sheet 10 is stuck on an article or its package or the like at normal temperature, the printing sheet 10 does not peel off even when the article or package is frozen thereafter. Moreover, the printing sheet 10 does not peel off even when the article or package is heated by microwaving or submerging in hot water after freezing. Then, after such a step of heating after freezing, when peeling at normal temperature, it is also possible to smoothly peel the printing sheet 10 without leaving an adhesive residue. Note that it is also possible to omit the planarization layer 20, as in the printing sheet 10A shown in FIG. 1B.

As above, according to Example 1, the base material film 12, the toner fixing layer 18 formed on one principal surface of the base material film 12, the planarization layer 20 formed on the other principal surface of the base material film 12, the adhesive layer 22 formed on the surface of the planarization layer 20, and the peeling film 24 stuck on the surface of the adhesive layer 22 compose the printing sheet 10. Furthermore, (1) the base material film 12 is provided with the laminated structure consisting of the white foamed PET film layer 14 on the toner fixing layer 18 side and the transparent non-foamed PET film layer 16 on the adhesive layer 22 side, so that the strength of the printing sheet 10 is improved, and the printing sheet 10 can be prevented from tearing when being peeled from an adherend.

(2) The planarization layer 20 formed of a colored ink layer is provided between the base material film 12 and the adhesive layer 22, so that the adhesive layer 22 has a wide bonding area with the base material film 12 side, and when the printing sheet 10 is peeled from an adherend, the phenomenon in which lines at the time of peeling are left on the sheet due to zipping can be prevented to achieve smooth peeling. In addition, because the lower layer of the base material film 12 is provided as the non-foamed PET film layer 16 in the present example, the contact area with the adhesive layer 22 is wide even when the planarization layer 20 is omitted, so that the same smooth peeling as above is possible.

(3) By providing the planarization layer 20, even when the white foamed PET film layer 14 of the base material film 12 is made thinner than that of a conventional sheet, it becomes possible to prevent transparency as a whole.

(4) Preferred examples of application of a glossy/matte type printing sheet 10 as in the present example include automotive paint surfaces, glass, mirrors, marble, tiles, lockers, and melamine resin surfaces to be used at bagging counters of supermarkets and the like. The application is performed in a manner such that, for example, the printing sheet 10 printed with a mark and the like is stuck on the body of an automobile. On the other hand, when the printing sheet 10 of the present example is used for labeling of sake and wine bottles, it is possible to remove the labels from the bottles collected after use and reuse the bottles, which makes effective use of resources possible.

Example 2

Figure 2A:
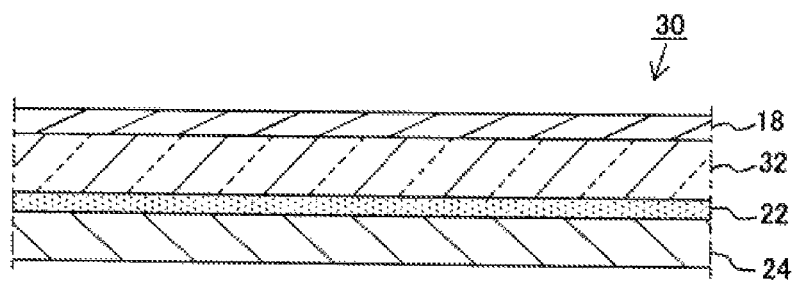
FIGS. 2(A), 2(B) and 2(C) are sectional views each showing a laminated structure of a printing sheet of Example 2 of the present invention.
Figure 2B:
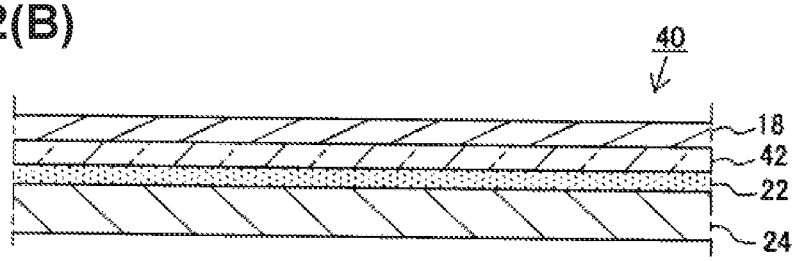
Figure 2C:
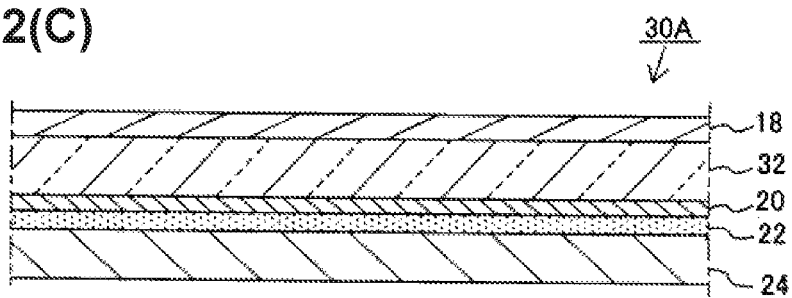

Next, Example 2 of the present invention will be described with reference to FIGS. 2(A), 2(B) and 2(C). Here, components the same as or corresponding to those of Example 1 described above will be denoted by the same reference signs (the same applies to the following example). FIGS. 2(A), 2(B) and 2(C) are sectional views each showing a laminated structure of a printing sheet of the present example. In Example 1 described above, the foamed PET film layer and the transparent non-foamed PET film layer are used in combination as the base material film, however, the present example is an example in which only a transparent non-foamed PET film is used as the base material film.

The printing sheet 30 shown in FIG. 2A is a transparent/translucent type sheet, in which the toner fixing layer 18 is formed on an upper surface of a base material film 32, and an adhesive layer 22 is formed on the lower surface side. A peeling film 24 is formed on a lower surface of the adhesive layer 22. As the base material film 32, a transparent non-foamed PET film layer is used. The toner fixing layer 18, the base material film 32, the adhesive layer 22, and the peeling film 24 have a total thickness of, for example, 80 to 300 μm. In addition, like the printing sheet 40 shown in FIG. 2B, a thin transparent printing sheet 10 may be provided by providing the same laminated structure as that of the printing sheet 30 and providing the thickness of a base material film 42 made of a transparent non-foamed PET film as 10 to 50 mm.

In the present example, because only the transparent non-foamed PET film layer is used as the base material film 32, 42, the strength is high and this makes it possible to prevent the printing sheet 30, 40 from tearing when peeling it from the adherend, that is, the same effect as that of Example 1 described above can be obtained. Moreover, because the non-foamed PET film is used, the bonding area between the base material film 32, 42 and the adhesive layer 22 is wide even without inserting a planarization layer, so that without leaving traces of peeling due to zipping, smooth peeling is possible, which is also the same as in Example 1 described above.

Furthermore, like the printing sheet 30A shown in FIG. 2C, providing a planarization layer 20 formed of a colored ink layer between the base material film 32 and the adhesive layer 22 to achieve non-transparency of the printing sheet according to its purpose of use while achieving a further improvement in peelability is not prevented.

As application examples of the transparent/translucent type printing sheet 30 as in the present example are automotive paint surfaces, glass, mirrors, marble, tiles, lockers, etc., can be mentioned in either case where the sheet is thick or thin. In particular, a thin printing sheet 30 is useful in a case such that an object adherend surface has a wavy shape. Moreover, a translucent printing sheet 30 is suitable for glass or the like, in such a case that the opposite side can be seen through the sheet. For example, when the translucent printing sheet 30 is stuck on an electrical decorative glass, light of the electrical decoration is transmitted through the printing sheet 30, and the effect of electrical decoration can be enhanced.

Example 3

Figure 3:
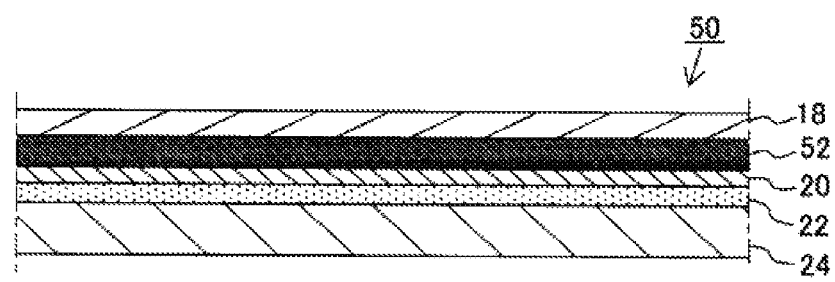
FIG. 3 is a sectional view showing a laminated structure of a printing sheet of Example 3 of the present invention.
Figure 4A:
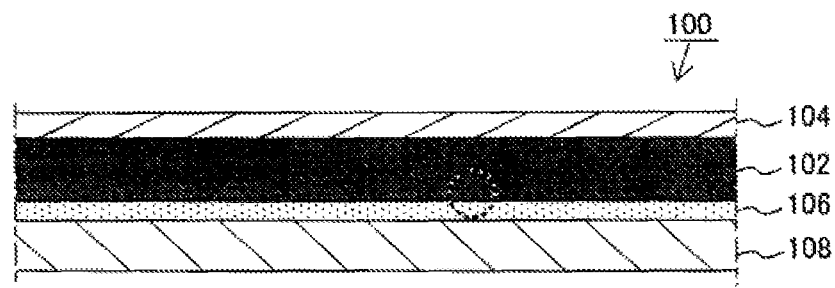
FIGS. 4(A) and 4(B) are views showing an example of a prior art.
Figure 4B:
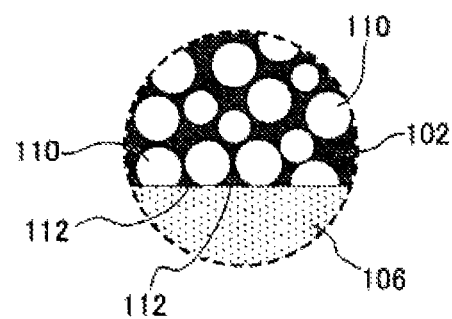

Next, Example 3 of the present invention will be described with reference to FIG. 3. FIG. 3 is a sectional view showing a laminated structure of a printing sheet of the present example. While in Example 1 described above, the foamed PET film and the transparent non-foamed PET film are used in combination as the base material film, the present example is an example in which only a white foamed PET film is used as the base material film.

The printing sheet 50 shown in FIG. 3 is a thin glossy type sheet, in which the toner fixing layer 18 is formed on an upper surface of a base material film 52, and a planarization layer 20 is formed on the lower surface side. An adhesive layer 22 is formed on the surface of the planarization layer 20, and a peeling film 24 is formed on a lower surface of the adhesive layer 22. As the base material film 52, for example, a white foamed PET film is used, but the foamed PET film is not limited to white, which is the same as in Example 1 described above.

In the present example, only the white foamed PET film is used as the base material film 52, however, the planarization layer 20 formed of a colored ink layer is provided between the base material film 52 and the adhesive layer 22. Therefore, as in Example 1 described above, the bonding area of the adhesive layer 22 with the base material 52 side increases, so that without leaving traces of peeling due to zipping, smooth peeling is possible. Moreover, because smooth peeling is possible, the printing sheet 50 becomes less likely to be torn when peeled from an adherend, and the strength is thus improved as well.

It is noted, however, the present invention is not limited to each of the examples described above, and various modifications can be added thereto without departing from the scope of the present invention. For example, the following are also included in the scope of the present invention:

(1) The shapes, dimensions, numerical values of thickness indicated with each of the examples described above are mere examples, and the thicknesses of the respective layers may be appropriately changed as long as they are within a range compatible with the printing equipment.

(2) The materials indicated with the above-described example are also mere examples, and various publicly known materials may be used as long as they provide the same effect.

(3) In the above-described example, as the foamed PET film, one containing a white pigment was described as an example, but the foamed PET film may contain a pigment other than white.

(4) In the above-described example, as the planarization layer 20, one formed of a white ink layer was described as an example, but this does not prevent use of another colored ink layer 20. Moreover, various publicly known materials can be used as the material that form these colored ink layers.

(5) The printing sheet of the present invention is suitable as a tacking sheet to be used in an environment with a temperature change (such as heating after freezing), but this is also a mere example, and the present invention can be applied to various other publicly known uses.

INDUSTRIAL APPLICABILITY

A printing sheet according to the present invention includes a base material film, a toner fixing layer which is formed on one principal surface of the base material film and is printable, an adhesive layer which is formed on the other principal surface of the base material film, and a peeling film which is stuck on the surface of the adhesive layer, and adopts any of the following:

(1) the base material film is a transparent non-foamed polyethylene terephthalate resin film;

(2) the base material film has a laminated structure of a foamed polyethylene terephthalate resin film on the toner fixing layer side and a transparent non-foamed polyethylene terephthalate resin film on the adhesive layer side; and (3) the base material film is a foamed polyethylene terephthalate resin film, and a planarization layer is provided between the base material film and the adhesive layer. Therefore, the printing sheet having a toner fixing layer is improved in strength and smooth peeling without leaving traces of peeling becomes possible when it is peeled from an adherend, and can be applied to printing sheet uses such as tacking sheets. In particular, the present invention is suitable for use as a tacking sheet to be stuck on an object that is expected to be frozen or submerged in hot water.

REFERENCE SIGNS LIST 10, 10A: Printing sheet
12: Base material film
14: White foamed PET film layer (white foamed PET layer)
16: Transparent non-foamed PET film layer (transparent PET layer)
18: Toner fixing layer
20: Planarization layer
22: Adhesive layer
24: Peeling film
30, 30A: Printing sheet
32: Base material film
40: Printing sheet
42: Base material film
50: Printing sheet
52: Base material film
100: Printing sheet
102: Base material film
104: Toner fixing layer
106: Adhesive layer
108: Peeling film
110: Foam
112: Bonding portion

The invention claimed is:

1. A printing sheet comprising:
a base material film;
a toner fixing layer which is formed on one principal surface of the base material film and is printable;
an adhesive layer which is formed at a side of the other principal surface of the base material film;
a planarization layer provided between the base material film and the adhesive layer; and
a peeling film which is stuck on a surface of the adhesive layer,
wherein the base material film includes a foamed polyethylene terephthalate resin film at a side of the toner fixing layer and a transparent non-foamed polyethylene terephthalate resin film at a side of the adhesive layer to form a laminated structure, and the adhesive layer is formed of an ethylene-vinyl acetate copolymer resin.

2. The printing sheet according to claim 1, wherein the foamed polyethylene terephthalate resin film has a thickness of 30 to 40 μm and the transparent non-foamed polyethylene terephthalate resin film has a thickness 40 to 60 μm.

3. The printing sheet according to claim 2, wherein the toner fixing layer is formed of a urethane-based material and has a thickness of 1 μm to 4 μm, and
the planarization layer is formed of a mixture of titanium oxide and a urethane based material.

4. A printing sheet comprising:
a base material film;
a toner fixing layer which is formed on one principal surface of the base material film and is printable;
an adhesive layer which is formed at a side of the other principal surface of the base material film;
a planarization layer provided between the base material film and the adhesive layer; and
a peeling film which is stuck on a surface of the adhesive layer,
wherein the base material film is a transparent non-foamed polyethylene terephthalate resin film, the adhesive layer is formed of an ethylene-vinyl acetate copolymer resin, and the planarization layer is a colored ink layer.

5. A printing sheet comprising:
a base material film;
a toner fixing layer which is formed on one principal surface of the base material film and is printable;
a planarization layer which is formed on the other principal surface of the base material film;
an adhesive layer which is formed on a surface of the planarization layer; and
a peeling film which is stuck on a surface of the adhesive layer,
wherein the base material film is a foamed polyethylene terephthalate resin film, the adhesive layer is formed of an ethylene-vinyl acetate copolymer resin, and the planarization layer is a colored ink layer.

* * * * *